(12) United States Patent
Sagar et al.

(10) Patent No.: US 11,323,940 B1
(45) Date of Patent: May 3, 2022

(54) OPTIMAL INTERFERENCE HANDLING IN MULTICELL ENVIRONMENT WHEN CONDITIONAL CELL CHANGEOVER IS CONFIGURED

(71) Applicant: QUALCOMM Incorporated, San Diego, CA (US)

(72) Inventors: Sagar, Hyderabad (IN); Avinash Kumar Dubey, Hyderabad (IN); Mohammad Suhel Ashfaque, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/166,744

(22) Filed: Feb. 3, 2021

(51) Int. Cl.
| H04W 4/00 | (2018.01) |
| H04W 36/20 | (2009.01) |
| H04W 36/00 | (2009.01) |
| H04W 72/14 | (2009.01) |
| H04W 36/22 | (2009.01) |
| H04W 24/08 | (2009.01) |

(52) U.S. Cl.
CPC ........... *H04W 36/20* (2013.01); *H04W 24/08* (2013.01); *H04W 36/0072* (2013.01); *H04W 36/00837* (2018.08); *H04W 36/22* (2013.01); *H04W 72/14* (2013.01)

(58) Field of Classification Search
None
See application file for complete search history.

(56) References Cited

U.S. PATENT DOCUMENTS

2008/0045139 A1* 2/2008 Chen ..................... H04W 16/14
455/3.04

* cited by examiner

*Primary Examiner* — Suhail Khan
(74) *Attorney, Agent, or Firm* — Muncy, Geissler, Oids & Lowe, P.C.

(57) ABSTRACT

Techniques for optimal interference handling in a multicell environment when conditional cell changeover is configured are disclosed. A user equipment (UE) may receive a conditional changeover command (e.g., conditional handover (CHO), conditional primary secondary cell (PSCell) change CPC)) from a serving cell. The conditional changeover command may include a neighbor cell configuration of a neighbor cell set comprising one or more cells that neighbor the serving cell. The neighbor cell configuration may indicate resource configurations of downlink (DL) resources the neighbor cell set. The UE may utilize the neighbor cell configuration to determine potential interferences due to the resources of the serving cell colliding with the resources of the neighbor cell set, and take mitigation steps to address the potential interferences.

30 Claims, 9 Drawing Sheets

```
TDD-UL-DL-Pattern ::= SEQUENCE {
    dl-UL-TransmissionPeriodicity    ENUMERATED    {ms0p5, ms0p625, ms1, ms1p25,
                                                   ms2, ms2p5, ms5, ms10},
    nrofDownlinkSlots                INTEGER       (0..maxNrofSlots),
    nrofDownlinkSymbols              INTEGER       (0..maxNrofSymbols-1),
    nrofUplinkSlots                  INTEGER       (0..maxNrofSlots),
    nrofUplinkSymbols                INTEGER       (0..maxNrofSymbols-1),
    ...,
    [[
    dl-UL-TransmissionPeriodicity-v1530    ENUMERATED    {ms3, ms4}    OPTIONAL -- Need R
    ]]
}
```

*FIG. 3*

OPTIMAL INTERFERENCE HANDLING IN MULTICELL ENVIRONMENT WHEN CONDITIONAL CELL CHANGEOVER IS CONFIGURED

TECHNICAL FIELD

Various aspects described herein generally relate to wireless communication systems, and more particularly, for enabling optimal interference handling in a multicell environment when conditional cell changeovers (e.g., conditional handover (CHO), a conditional primary secondary cell (PSCell) change (CPC), etc.) are configured.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or Worldwide Interoperability for Microwave Access (WiMAX)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G New Radio (NR) connectivity, or simply NR connectivity, has gained significant commercial traction in recent time. Thus, to attract more users to their network, network operators would like to show NR connectivity to users most of the time on the user interface (UI) of the mobile device such as the user equipment (UE).

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary user equipment (UE) is disclosed. The UE may comprise a processor, a memory, and a transceiver. The processor, the memory, and/or the transceiver may be configured to receive, from a serving cell, a conditional changeover command comprising a neighbor cell configuration of a neighbor cell set comprising one or more cells that neighbor the serving cell. The neighbor cell configuration may indicate resource configurations of downlink (DL) resources of the cells of the neighbor cell set. The processor, the memory, and/or the transceiver may also be configured to determining, based on the neighbor cell configuration, an overlap portion comprising uplink (UL) resources of the serving cell that overlap in time with the DL resources of the cells of the neighbor cell set. The processor, the memory, and/or the transceiver may further be configured to determine an overlap interference representing interference present in a UE-serving cell channel during the overlap portion. The UE-serving cell channel may be a communication channel between the UE and the serving cell. The processor, the memory, and/or the transceiver may yet be configured to determine, based on the overlap interference, whether a channel interference tolerance is exceeded. The processor, the memory, and/or the transceiver may yet further be configured to perform, when the channel interference tolerance is exceeded, a probabilistic transmission of a UL traffic to the serving cell on granted UL resources. The UL traffic may comprise data. Also, a likelihood of the UL traffic being transmitted to the serving cell may be less than one.

An exemplary method of a user equipment (UE) is disclosed. The method may comprise receiving, from a serving cell, a conditional changeover command comprising a neighbor cell configuration of a neighbor cell set comprising one or more cells that neighbor the serving cell. The neighbor cell configuration may indicate resource configurations of downlink (DL) resources of the cells of the neighbor cell set. The method may also comprise determining, based on the neighbor cell configuration, an overlap portion comprising uplink (UL) resources of the serving cell that overlap in time with the DL resources of the cells of the neighbor cell set. The method may further comprise determining an overlap interference representing interference present in a UE-serving cell channel during the overlap portion. The UE-serving cell channel may be a communication channel between the UE and the serving cell. The method may yet comprise determining, based on the overlap interference, whether a channel interference tolerance is exceeded. The method may yet further comprise performing, when the channel interference tolerance is exceeded, a probabilistic transmission of a UL traffic to the serving cell on granted UL resources. The UL traffic may comprise data. Also, a likelihood of the UL traffic being transmitted to the serving cell may be less than one.

Another exemplary user equipment (UE) is disclosed. The UE may comprise means for receiving, from a serving cell, a conditional changeover command comprising a neighbor cell configuration of a neighbor cell set comprising one or more cells that neighbor the serving cell. The neighbor cell configuration may indicate resource configurations of downlink (DL) resources of the cells of the neighbor cell set. The UE may also comprise means for determining, based on the neighbor cell configuration, an overlap portion comprising uplink (UL) resources of the serving cell that overlap in time with the DL resources of the cells of the neighbor cell set. The UE may further comprise means for determining an overlap interference representing interference present in a UE-serving cell channel during the overlap portion. The UE-serving cell channel may be a communication channel between the UE and the serving cell. The UE may yet comprise means for determining, based on the overlap interference, whether a channel interference tolerance is exceeded. The UE may yet further comprise means for performing, when the channel interference tolerance is exceeded, a probabilistic transmission of a UL traffic to the serving cell on granted UL resources. The UL traffic may comprise data. Also, a likelihood of the UL traffic being transmitted to the serving cell may be less than one.

A non-transitory computer-readable medium storing computer-executable instructions for a user equipment (UE) is disclosed. The executable instructions may comprise one or more instructions instructing the UE to receiving, from a serving cell, a conditional changeover command comprising a neighbor cell configuration of a neighbor cell set comprising one or more cells that neighbor the serving cell. The neighbor cell configuration may indicate resource configurations of downlink (DL) resources of the cells of the neighbor cell set. The executable instructions may also comprise one or more instructions instructing the UE to determine, based on the neighbor cell configuration, an overlap portion comprising uplink (UL) resources of the serving cell that overlap in time with the DL resources of the cells of the neighbor cell set. The executable instructions may further comprise one or more instructions instructing the UE to determine an overlap interference representing interference present in a UE-serving cell channel during the overlap portion. The UE-serving cell channel may be a communication channel between the UE and the serving cell. The executable instructions may yet comprise one or more instructions instructing the UE to determine, based on the overlap interference, whether a channel interference tolerance is exceeded. The executable instructions may yet further comprise one or more instructions instructing the UE to perform, when the channel interference tolerance is exceeded, a probabilistic transmission of a UL traffic to the serving cell on granted UL resources. The UL traffic may comprise data. Also, a likelihood of the UL traffic being transmitted to the serving cell may be less than one.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof:

FIG. 3 illustrates an example information element indicating a configuration of uplink and downlink resources of a cell;

DETAILED DESCRIPTION

Figure 1:
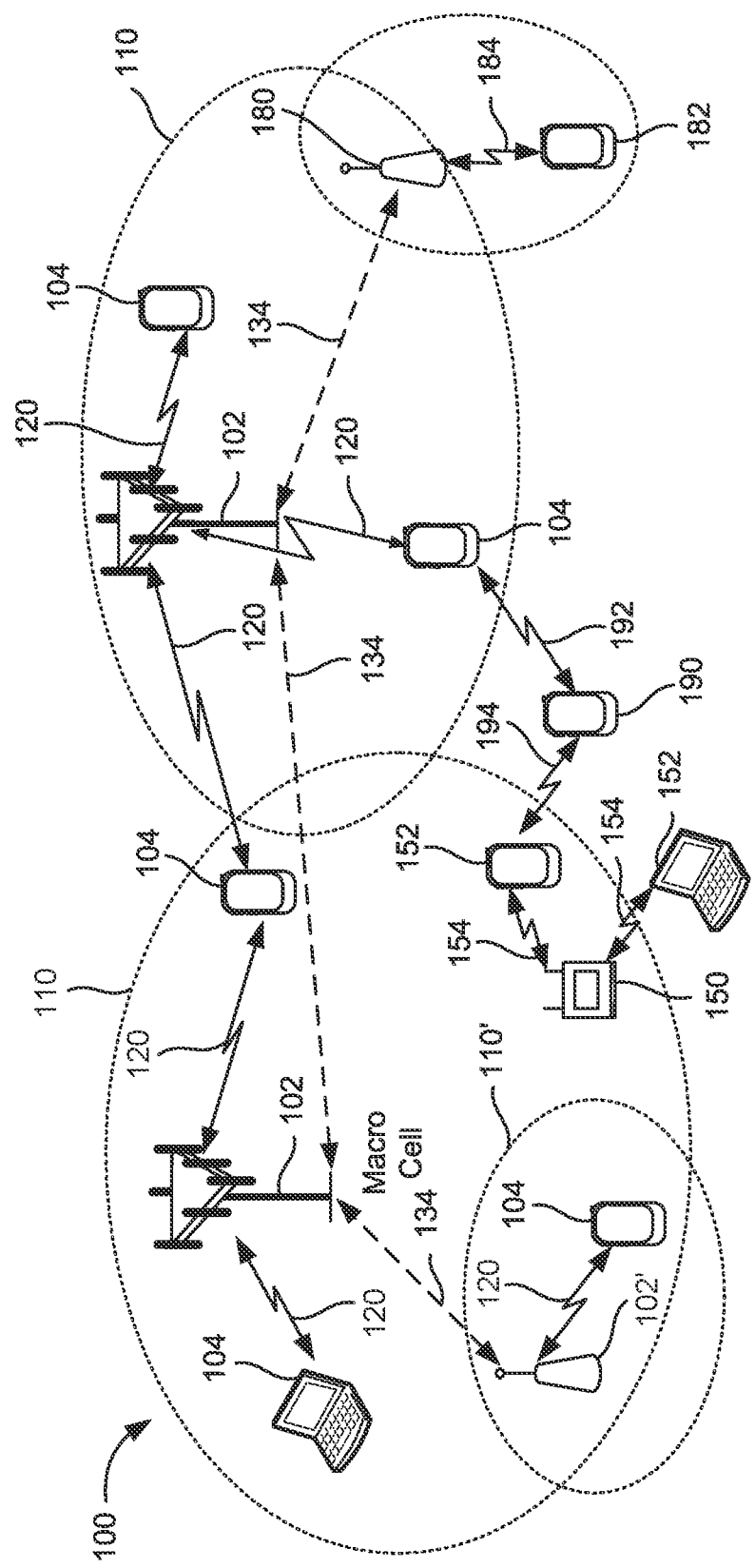
FIG. 1 illustrates an exemplary wireless communications system in accordance with one or more aspects of the disclosure.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, terms "user equipment" (UE) and "base station" are not intended to be specific or otherwise limited to any particular Radio Access Technology (RAT), unless otherwise noted. In general, UEs may be any wireless communication device (e.g., mobile phone, router, tablet computer, laptop computer, consumer asset tracking device, Internet of Things (IoT) device, etc.) used by user to communicate over wireless communications network. UE may be mobile or may (e.g., at certain times) be stationary, and may communicate with Radio Access Network (RAN). As used herein, "UE" may be referred to interchangeably as "access terminal" or "AT," "client device," "wireless device," "subscriber device," "subscriber terminal," "subscriber station," "user terminal" UT, "mobile terminal," "mobile station," or variations thereof. Generally, UEs can communicate with core network via RAN, and through the core network the UEs can be connected with external networks such as Internet and with other UEs. Of course, other mechanisms of connecting to core network and/or the Internet are also possible for UEs, such as over wired access networks, WiFi networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as Access Point (AP), Network Node, NodeB, evolved NodeB (eNB, eNodeB), general Node B (gNB, gNodeB), etc. In addition, in some systems base station may provide edge node signaling functions, while in other systems it may provide additional control and/or network management functions.

UEs can be embodied by any of a number of device types including but not limited to printed circuit (PC) cards, compact flash devices, external or internal modems, wireless or wireline phones, smartphones, tablets, consumer asset tracking devices, asset tags, and so on. Communication link through which UEs can send signals to RAN may be referred to as uplink (UL) channel (e.g., reverse traffic channel, reverse control channel, access channel, etc.). Communication link through which RAN can send signals to UEs may be referred to as downlink (DL) or forward link channel (e.g., paging channel, control channel, broadcast channel, forward traffic channel, etc.). As used herein, term traffic channel (TCH) can refer to either a UL/reverse or DL/forward traffic channel.

FIG. 1 illustrates an exemplary wireless communications system 100 according to one or more aspects. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to a Long-Term Evolution (LTE) network, gNodeBs (gNBs) where the wireless communications system 100 corresponds to a 5G network, and/or a combination thereof, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighbor macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs) and/or Home gNBs (HgNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple input multiple output (MIMO) antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the radio frequency (RF) range in the electromagnetic spectrum. EHF has a range of 30 GHz to 300 GHz and a wavelength between 1 and 10 mm. Radio waves in this band may be referred to as a millimeter wave. Near mmW may extend down to a frequency of 3 GHz with a wavelength of 100 mm. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on. Any of the base stations 102, 102', 180 may send measurement requests (e.g., measurement control order (MCO)) to the UEs 104, 182, 190, and the UE's 104, 182, 190 may respond with measurement reports accordingly.

Figure 2:
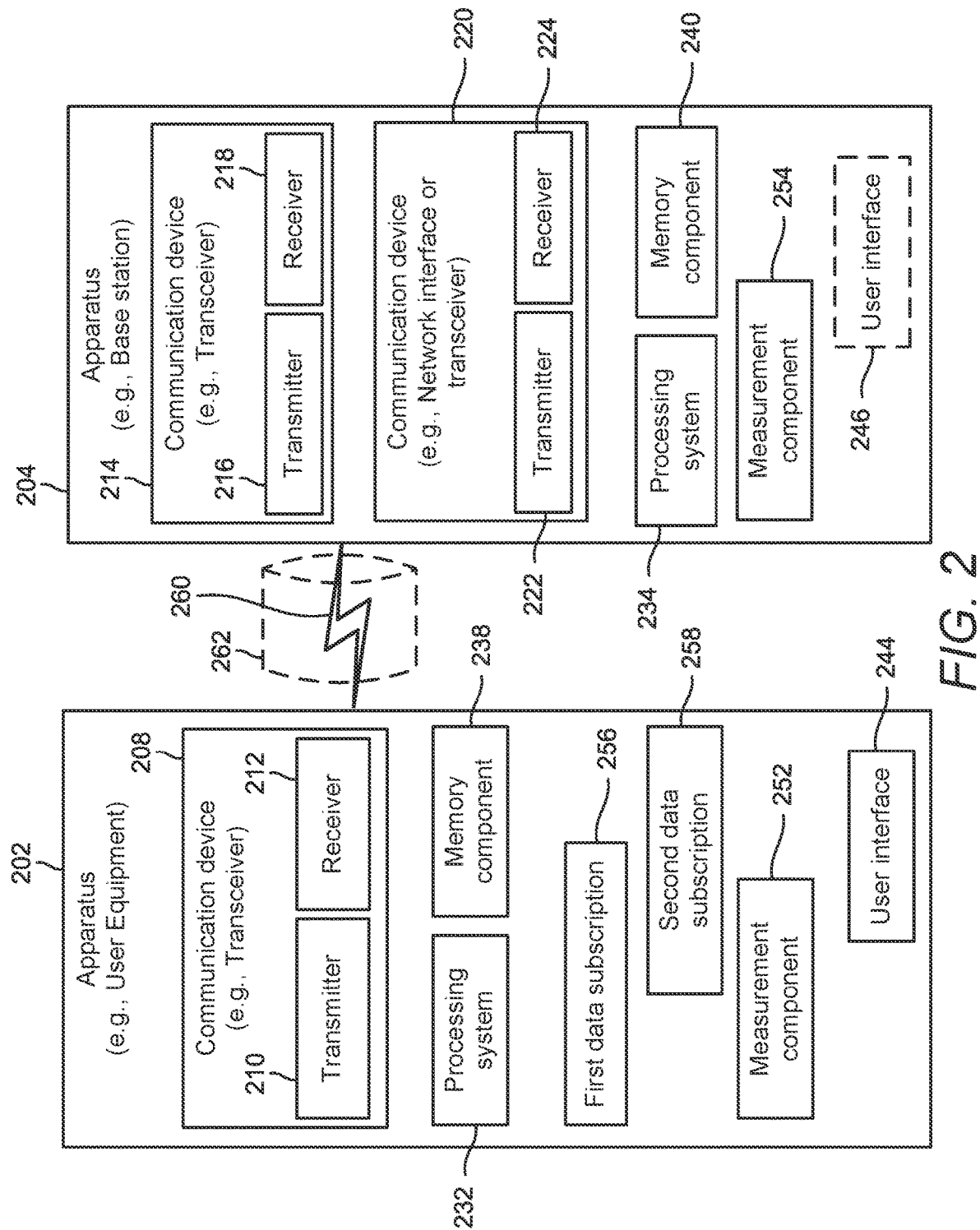
FIG. 2 is a simplified block diagram of several sample aspects of components that may be employed in wireless communication nodes and configured to support communication in accordance with one or more aspects of the disclosure.

FIG. 2 illustrates several sample components (represented by corresponding blocks) that may be incorporated into an apparatus 202 and an apparatus 204 (corresponding to, for example, a UE and a base station (e.g., eNB, gNB), respectively, to support the operations as disclosed herein. As an example, the apparatus 202 may correspond to a UE, and the apparatus 204 may correspond to a network node such as a gNB and/or an eNB. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 202 may include at least one wireless communication device (represented by the communication device 208) for communicating with other nodes via at least one designated RAT (e.g., LTE, NR, etc.). The communication device 208 may include at least one transmitter (represented by the transmitter 210) for transmitting and encoding signals (e.g., messages, indications, information, and so on) and at least one receiver (represented by the receiver 212) for receiving and decoding signals (e.g., messages, indications, information, pilots, and so on).

The apparatus 204 may include at least one wireless communication device (represented by the communication device 214) for communicating with other nodes via at least one designated RAT (e.g., LTE, NR, etc.). The communication device 214 may include at least one transmitter (represented by the transmitter 216) for transmitting signals (e.g., messages, indications, information, pilots, and so on) and at least one receiver (represented by the receiver 218) for receiving signals (e.g., messages, indications, information, and so on).

For one or both apparatuses 202, 204, a transmitter and a receiver may comprise an integrated device (e.g., embodied as a transmitter circuit and a receiver circuit of a single communication device) in some implementations, may comprise a separate transmitter device and a separate receiver device in some other implementations, or may be embodied in other ways in yet other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 204 may also comprise a Network Listen Module (NLM) or the like for performing various measurements.

The apparatus 204 may include at least one communication device (represented by the communication device 220) for communicating with other nodes. For example, the communication device 220 may comprise a network interface (e.g., one or more network access ports) configured to communicate with one or more network entities via a wire-based or wireless backhaul connection. In some aspects, the communication device 220 may be implemented as a transceiver configured to support wire-based or wireless signal communication. This communication may involve, for example, sending and receiving messages, parameters, or other types of information. Accordingly, in the example of FIG. 2, the communication device 220 is shown as comprising a transmitter 222 and a receiver 224 (e.g., network access ports for transmitting and receiving).

The apparatuses 202 and 204 may also include other components used in conjunction with the operations as disclosed herein. The apparatus 202 may include a processing system 232 for providing functionality relating to, for example, communication with the network. The apparatus 204 may include a processing system 234 for providing functionality relating to, for example, communication with the UEs. In an aspect, the processing systems 232 and 234 may include, for example, one or more general purpose processors, multi-core processors, ASICs, digital signal processors (DSPs), field programmable gate arrays (FPGA), or other programmable logic devices or processing circuitry.

The apparatuses 202 and 204 may include measurement components 252 and 254 that may be used to obtain channel related measurements. The measurement component 252 may measure one or more downlink (DL) signals such as channel state information reference signal (CSI-RS), phase tracking reference signal (PTRS), primary synchronization signal (PSS), secondary synchronization signal (SSS), demodulation reference signal (DMRS), etc. The measurement component 254 may measure one or more uplink (UL) signals such as DMRS, sounding reference signal (SRS), etc.

The apparatuses 202 and 204 may include memory components 238 and 240 (e.g., each including a memory device), respectively, for maintaining information (e.g., information indicative of reserved resources, thresholds, parameters, and so on). In various implementations, memory 238 can comprise a computer-readable medium storing one or more computer-executable instructions for a user equipment (UE) where the one or more instructions instruct apparatus 202 (e.g., processing system 232 in combination with communications device 208 and/or other aspects of apparatus 202) to perform any of the functions discussed herein. In addition, the apparatuses 202 and 204 may include user interface devices 244 and 246, respectively, for providing indications (e.g., audible and/or visual indications) to a user and/or for receiving user input (e.g., upon user actuation of a sensing device such a keypad, a touch screen, a microphone, and so on).

The apparatus 202 may include first and second data subscriptions (e.g., subscriber identify modules (SIMs)) 256 and 258 that may be associated with providing services in same or different RATs (e.g., 5G NR, 4G LTE).

For convenience, the apparatuses 202 and 204 are shown in FIG. 2 as including various components that may be configured according to the various examples described herein. It will be appreciated, however, that the illustrated blocks may have different functionality in different designs. The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 208, 232, 238, and 244 may be implemented by processor and memory component(s) of the apparatus 202 (e.g., by execution of appropriate code and/or by appropriate configuration of processor components). Similarly, some or all of the functionality represented by blocks 214, 220, 234, 240, and 246 may be implemented by processor and memory component(s) of the apparatus 204 (e.g., by execution of appropriate code and/or by appropriate configuration of processor components).

In an aspect, the apparatus 204 may correspond to a "small cell" or a Home gNodeB. The apparatus 202 may transmit and receive messages via a wireless link 260 with the apparatus 204, the messages including information related to various types of communication (e.g., voice, data, multimedia services, associated control signaling, etc.). The wireless link 260 may operate over a communication medium of interest, shown by way of example in FIG. 2 as the medium 262, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 204 and the apparatus 202 for the medium 262.

In general, the apparatus 202 and the apparatus 204 may operate via the wireless link 260 according to one or more radio access types, such as LTE, LTE-U, or NR, depending on the network in which they are deployed. These networks may include, for example, different variants of CDMA networks (e.g., LTE networks, NR networks, etc.), TDMA networks, FDMA networks, Orthogonal FDMA (OFDMA) networks, Single-Carrier FDMA (SC-FDMA) networks, and so on.

A UE may be capable of operating in multiple radio access technologies (RATs). For example, a UE may be capable of operating in a first RAT (e.g., LTE) and in a second RAT (e.g., NR). These are merely examples, and first and second RATs may be any of the RATs currently known (e.g., WiMax, CDMA, Wideband CDMA (WCDMA), Universal Terrestrial Radio Access (UTRA), Evolved UTRA (E-UTRA), GSM, FDMA, GSM, TDMA, etc.).

Also, a UE may be capable of operating in multiple RATs at the same time. For example, a UE that can operate in both LTE and NR simultaneously is an E-UTRA-NR Dual Connectivity (ENDC) capable UE. Note that ENDC is an example of Multi-RAT DC (MRDC) capability. In general, when an MRDC capable UE is operating in two RATs, it may be communicating with a base station (e.g., eNB) of a first RAT (e.g., LTE) and with a base station (e.g., gNB) of a second RAT (e.g., NR). When the UE operates in the first RAT, it may communicate with a network node (e.g., base station, eNB, etc.) of the first RAT. Similarly, when the UE operates in the second RAT, it may communicate with a network node (e.g., base station, gNB, etc.) of the second RAT.

In a 5G NR time division duplex (TDD) cell, some slots are allocated for DL traffic (from cell to UE) and some slots are allocated for UL traffic (from UE to cell). If a neighbor cell is deployed on a same or overlapping frequency as a serving cell, then DL/UL performance of the serving cell, at least from the perspective of the UE being served by the serving cell, can be negatively affected by the neighbor cell. This can occur when UL slots of the serving cell overlap with DL slots of the neighbor cell and/or when DL slots of the serving cell overlap with UL slots of the neighbor cell. When there are such overlaps between the serving and neighbor cells deployed on same or overlapping frequency, channel condition between the serving cell and the UE can deteriorate due to resulting interferences. This may manifest as increased errors (e.g., bit error rate (BER), block error rate (BLER)) and/or increased noise (e.g., signal-to-noise ratio (SNR), signal-to-interference-plus-noise ratio (SINR)). When there are multiple neighbor cells deployed on the same or overlapping frequency as the serving cell, the channel condition between the serving cell and the UE can deteriorate even further.

Conventionally, when the channel condition between the UE and the serving cell deteriorates, a cell handover may take place so that the UE is connected to a new serving cell with better channel conditions. The new serving cell may be one of the cells that neighbor the old serving cell.

One issue with the conventional technique is that the handover process to improve the UE's connection with the network is typically initiated after the channel condition with the current serving cell has deteriorated. In legacy handover, the UE transmits measurement reports to the network, e.g., to the current serving cell, if the channel or link to the current serving cell degrades or a signal from a neighbor cell becomes stronger or better than the current serving cell. Based on the measurement reports, the network—the current serving cell—can handover the UE to the neighbor cell as the new serving cell. In this way, the UE will have better radio conditions.

However, if the handover process starts when the channel between the UE and the current serving cell starts to degrade, the conditions may be such that the measurement reports from the UE does not reach the current serving cell. Even if the measurement reports reach the current serving cell, and the handover decision is made, the handover command may not reach the UE. Result is that radio link failure (RLF) can occur, in which case, the UE and the network perform a recovery process, which can consume significant amount of resources of the network and the UE.

To address such issues associated with conventional techniques, in one or more aspects, the following is proposed. Initially, the UE may proactively determine whether the channel or link between the UE and a serving cell may potentially deteriorate. In particular, the UE may proactively determine whether the channel will experience interference when the UE is scheduled for uplink transmission. If the UE makes such determination, then the UE may randomly determine whether or not to actually transmit data to the serving cell on scheduled grants. In other words, the UE may decide to transmit on some occasions and may decide to withhold from transmitting on other occasions, and the decision may be randomly made. In this way, interference for the system may be reduced if other UEs also randomly decide to withhold their transmissions. In an aspect, the proposed techniques seek to reduce the interference in the system as a whole. This is unlike the purpose of conventional handovers, which is to reduce the interference experienced by the UE.

In an aspect, the phrase "proactively determine" may be used to indicate that the UE need not wait for the channel between the UE and the current serving cell to actually deteriorate before making such determination. The UE may start the determination process as soon as it has sufficient information (described further below). Result is that RLFs can be less likely to occur, which in turn can lead to more efficient usage of network and UE resources as well as enhancing user experience.

Note that the term "serving cell" may be generically used to indicate a main cell, also referred to as a special cell (SpCell), among a group of cells associated with the UE. That is, the serving cell may be a primary cell of a cell group. For example, in NR, a UE may be associated with a master cell group (MCG), which may include a primary cell (PCell). The MCG may also include zero or more secondary cells (SCell), i.e., the SCells may be optional. In this context, the PCell may be an example of the serving cell.

In some instances, the UE may also be associated with a secondary cell group (SCG), e.g., when UE operates in a dual-connectivity (DC) mode. The SCG may include a primary secondary cell (PSCell). The SCG may also include zero or more secondary secondary cells (SSCell), i.e., the SSCells may be optional. In this context, the PSCell may be an example of the serving cell.

In a further aspect, term "changeover" may be used to indicate a change in the primary cell, e.g., from a current serving cell to a new serving cell. One example of a cell changeover may be a handover of the UE, e.g., from a current PCell to a new PCell. Another example of a cell changeover may be a cell change, e.g., from a current PSCell to a new PSCell.

It is indicated above that the UE may determine whether the channel or link between the UE and the serving cell (also referred to as "UE/serving-cell channel" for ease of reference) may deteriorate. In case of TDD cells, recall from above that when UL slots of the serving cell overlap with DL slots of a neighbor cell and/or when DL slots of the serving cell overlap with UL slots of the neighbor cell, the UE/serving-cell channel can deteriorate. This implies that if the UE is aware of the TDD configuration of the neighbor cell ahead of time (e.g., while the UE/serving-cell channel condition is good), the UE may start the process to mitigate the potential deterioration of the UE/serving-cell channel before the channel actually deteriorates, or at least sufficiently before the point where RLF is likely.

In Third Generation Partnership Project (3GPP) Release 16 (Rel-16), conditional handover (CHO) and conditional PSCell change (CPC) are introduced to improve the robustness of handover process (e.g., from current PCell to new PCell) or cell change process (e.g., from current PSCell to new PSCell). CHO or CPC can reduce the likelihood of failures of legacy handovers and cell changes by the network sending (through the current serving cell) a conditional handover command (CHO command) or a conditional the PSCell change command (CPC command).

For example, when the UE receives the CHO command, it does not immediately apply the command. That is, the handover is not immediately executed upon receiving the CHO command. Instead, the handover is executed later if the condition or conditions associated with the CHO command are fulfilled. For example, one trigger condition may be that if strength and/or quality of a signal from a neighbor cell is some threshold greater than strength and/or quality of a signal from the current serving cell, the handover may be triggered (e.g., from current PCell to new PCell). Another trigger condition may be that if the strength and/or quality of the signal from the current serving cell falls below a minimum threshold, then the handover may be triggered. The UE may behave similarly when it receives the CPC command except that the condition or conditions may trigger a cell change (e.g., from current PSCell to new PSCell).

As a part of CHO or CPC, a number of cells (e.g., up to a maximum number (e.g., 8)) can be prepared in advance by the network for the UE to perform the CHO or the CPC. These configured cells may be cells that neighbor the current serving cell (e.g., current PCell or current PSCell. The network may notify the UE of the neighbor cell configurations, e.g., in a radio resource control (RRC) message transmitted from the current serving cell. Also, the notification may be provided when the radio conditions between the UE and the current serving cell are good, i.e., before triggering the handover/cell change.

In one or more aspects, the UE may utilize the neighbor cell configuration received from the network (e.g., from the current serving cell) to proactively determine whether the UE/serving-cell channel may deteriorate. The received neighbor cell configuration may indicate resource configurations of DL/UL resources (e.g., slots, frames, subframes, etc.) of one or more neighbor cells. In an aspect, TDD-UL-Pattern information element (IE) as specified in 3GPP Rel-16 Technical Specification (TS) 38.331, which indicates configuration of UL and DL resources, may be viewed as being an example of the DL/UL resource configuration. The TDD-UL-Pattern (IE) is reproduced in FIG. 3.

Based on the received neighbor cell configuration, the UE may determine whether the current UE/serving-cell channel may deteriorate. For example, the UE may compare the resource configurations of the neighbor cells with the resource configuration of the serving cell so as to determine whether any UL resources of the serving cell overlap with the DL resources of the neighbor cells. Some of the UL resources may be granted to the UE for use in transmitting data to the serving cell.

If there are overlapping resources (which implies that there is at least potential for deterioration of the UE/serving-cell channel during scheduled UL grants for the UE), the UE may estimate or otherwise determine the extent of the deterioration, and take mitigation steps (if deemed necessary) based on the estimation. For example, the UE may decide, at random, to transmit the UL traffic data on the granted UL resources (e.g., slots, frames, subframes) on some occasions, and to withhold transmission on the granted UL resources on other occasions.

Figure 4:
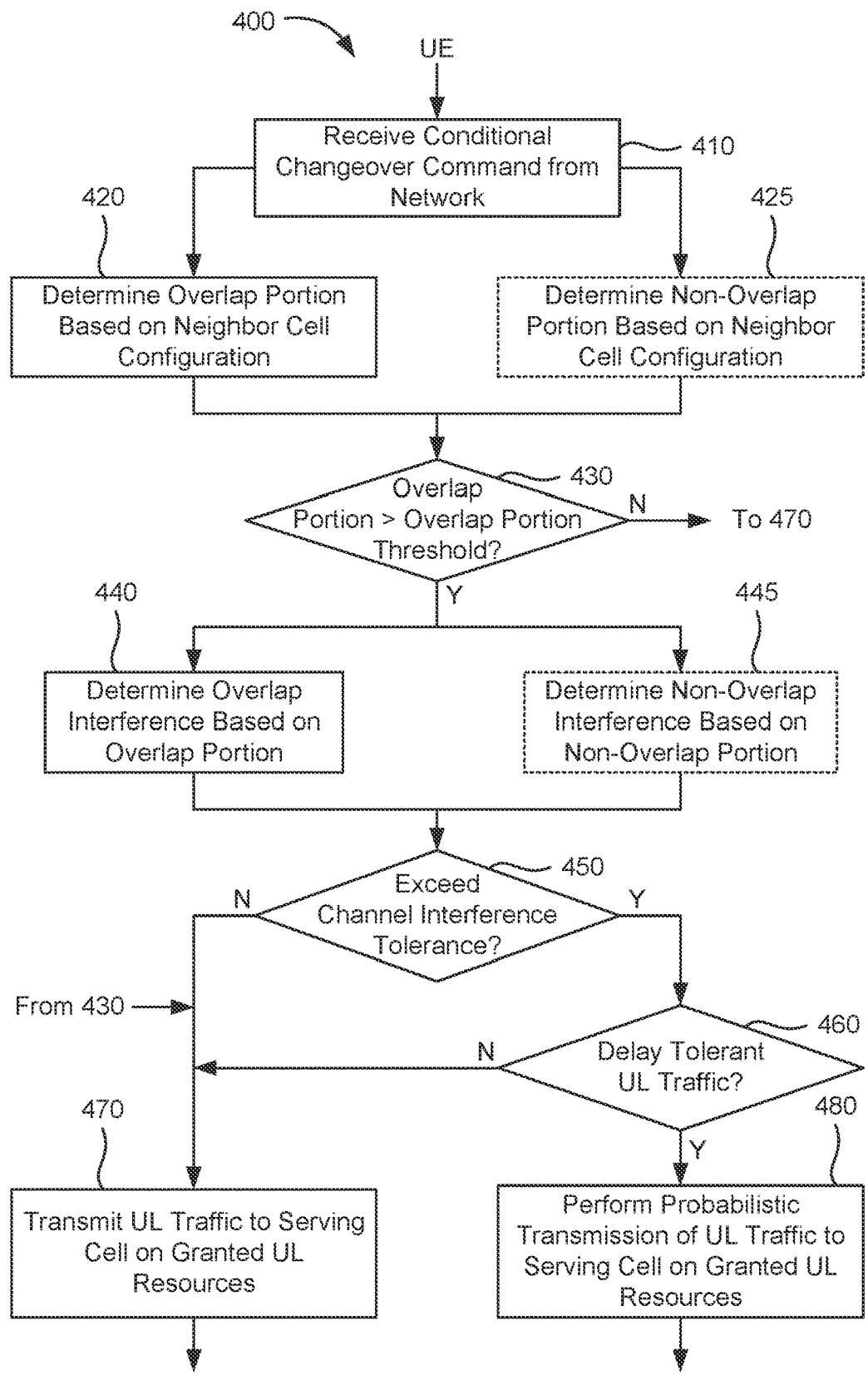
FIGS. 4-8 illustrate flow charts of an exemplary method performed by a user equipment for optimized interference handling in accordance with one or more aspects of the disclosure.

FIG. 4 illustrates a flow chart of an exemplary method 400 performed by a UE, e.g., to optimize interference handling in accordance with one or more aspects of the disclosure. The method 400 of FIG. 2 may be viewed as a generalization of the concepts described above. Here, the UE (such as the UE 202) may be capable of operating in multiple radio access technologies (RATs) such as 5G NR and 4G LTE RATs among others. For example, the UE may be able to operate in a dual-connectivity (DC) mode. The memory component 238 may be viewed as an example of a non-transitory computer-readable medium that stores computer-executable instructions to operate components of the UE 202 such as the transceiver 208 (including transmitter 210 and receiver 212), the processing system 232 (including one or more processors), memory component 238, etc.

In block 410, the UE (e.g., processing system 232, memory component 238, transceiver 208, etc.) may receive a conditional changeover command from a network. For example, the conditional changeover command received by the UE may be transmitted from a serving cell currently serving the UE. Examples of the conditional changeover command may include a CHO command, a CPC command, among others. The serving cell may be a time division duplex (TDD) cell.

The received conditional changeover command may include a neighbor cell configuration that indicates uplink/downlink (UL/DL) resource configurations of one or more neighbor cells. For ease of description, "neighbor cell set" may be used to group the neighbor cells. That is, the neighbor cell set may comprise one or more cells that neighbor the serving cell.

It can then be said that the neighbor cell configuration may indicate resource configurations of the cells of the neighbor cell set. In particular, for each cell of the neighbor cell set, the neighbor cell configuration may identify configurations of the DL resources of that cell, and also identify configurations of the UL resources of that cell. The resources may be identified as slots, frames, subframes, etc. The TDD-UL-Pattern IE illustrated in FIG. 3 may be an example of a resource configuration included in the neighbor cell configuration. It is significant to note that the UL/DL resource configurations of the neighbor cells—the cells of the neighbor cell set—can be provided by the serving cell instead of by the neighbor cells themselves. This means that the UE need not be camped on the neighbor cells themselves to receive their UL/DL resource configurations.

Each cell of the neighbor cell set may be an inter-frequency cell or an intra-frequency cell. An inter-frequency cell may be defined as a cell that that operates on a different frequency from the serving cell. From another perspective, an inter-frequency cell may be a cell that that operates on a frequency range that does not overlap with the frequency range of the serving cell.

On the other hand, an intra-frequency cell may be defined as a cell that operates on a same or overlapping frequency as the serving cell. From another perspective, an intra-frequency cell may be a cell that that operates on a frequency range that does overlap with the frequency range of the serving cell.

The conditional changeover command may also include one or more changeover conditions that specify condition or conditions, when met by any cell of the neighbor cells, can trigger a changeover of the UE from the serving cell to a target cell, in which the target cell is one of the neighbor cells that meets the changeover condition or conditions.

In block 420, based on the received neighbor cell configuration, the UE (e.g., processing system 232, memory component 238, etc.) may calculate or otherwise determine overlap portion (OverlapPortion). For example, the UE may compare the DL resource configurations of the cells of the neighbor cell set with the UL resource configuration of the serving cell to determine the overlap portion.

The overlap portion may comprise the UL resources of the serving cell that overlap in time with the DL resources of the cells of the neighbor cells set. Each of the resources (e.g., UL resources of the serving cell, DL resources of the cells of the neighbor set) may be expressed in any combination of slots, frames, subframes, etc. This also implies that the overlap portion may also be expressed in any combination of slots, frames, subframes, etc. For example, if the resource configurations are expressed in slots, OverlapPortion may be rewritten as OverlapSlots.

It is noted that the interference on the UE-serving cell channel due to inter-frequency cells may be minimal since, by definition, these cells operate in different frequencies from the serving cell. Thus, in an aspect, the resource configurations of inter-frequency cells of the neighbor cell set need not be considered in determining the overlap portion. In this aspect, the overlap portions may respectively comprise UL resources of the serving cell that overlap in time with the DL resources of the intra-frequency cells of the neighbor cell set.

In block 425, based on the received neighbor cell configuration, the UE (e.g., processing system 232, memory component 238, etc.) may calculate or otherwise determine a non-overlap portion (NonOverlapPortion), also by comparing resource configurations of the cells of the neighbor cell set with the resource configuration of the serving cell. Block 425 is illustrated as a dashed box to indicate that the block can be optional. The non-overlap portion may comprise the UL resources of the serving cell that do not overlap in time with the DL resources of the cells of the neighbor cells set. The non-overlap portion may be expressed in any combination of slots, frames, subframes, etc.

Again, if it is deemed that the interference on the UE-serving channel due to the inter-frequency cells are minimal, then the resource configurations of the inter-frequency may be removed from consideration in determining the non-overlap portion. Then the non-overlap portion may comprise UL resources of the serving cell that do not overlap in time with the DL resources of the intra-frequency cells of the neighbor cell set.

In an aspect, the interference handling may be accomplished with or without considerations of interferences occurring during non-overlap portions. That is, block 425 may be optional (as indicated by a dashed box). Also, if block 425 is performed, blocks 420 and 425 may be performed contemporaneously. This is because a communication resource (e.g., slot, frame, subframe, etc.) of the serving cell is either an overlapping resource or not.

In block 430, the UE (e.g., processing system 232, memory component 238, etc.) may determine whether the overlap portion is greater than overlap portion threshold (OverlapPortionThresh). Note that interferences on the UE-serving cell channel will likely be very significant during the overlap portion. However, if the overlap portion is very small or otherwise insignificant, then it may be deemed that interference mitigation actions are not necessary. The overlap portion threshold may represent the dividing line between significant and insignificant level of the overlap portion. The overlap portion threshold may be set within the UE (e.g., as a factory setting) and/or set by the network (e.g., through RRC configuration message). The overlap portion threshold may indicate a count (e.g., number of slots, frames, subframes, etc.) or may indicate a relation such as a proportion or a ratio.

If the overlap portion is not greater than the overlap portion threshold ("N" branch from block 430), the method may proceed to block 470 on the following assumptions: first, the UE has data for transmission to the serving cell (referred to as "UL traffic" for convenience), and second, the UE has been granted UL resources (e.g., slots, frames, subframes, etc.) to make such transmission. In block 470, the UE (e.g., processing system 232, memory component 238, transceiver 208, etc.) may transmit the UL traffic to the serving cell on UL resources (e.g., slots, frames, subframes, etc.) granted to the UE.

On the other hand, if the UE determines that the overlap portion is greater than the overlap portion threshold ("Y" branch from block 430), the UE may proceed to block 440. Optionally, the UE may also proceed to block 445 if the overlap portion is greater than the overlap portion threshold. Note that if the overlap portion is greater than the overlap portion, this implies that the UE-serving cell channel may experience significant interference. For convenience, "overlap interference" will be used to refer to the interference present on the UE-serving cell channel during the overlap portion. Also for convenience, "non-overlap interference" will be used to refer to the interference present on the UE-serving cell channel during the non-overlap portion.

In block 440, the UE (e.g., processing system 232, memory component 238, transceiver 208, measurement component 252, etc.) may estimate over otherwise determine the overlap interference (OverlapIntrf). Optionally, in block 445, the UE (e.g., processing system 232, memory component 238, transceiver 208, measurement component 252, etc.) may estimate over otherwise determine the non-overlap interference (NonOverlapIntrf).

Figure 5:
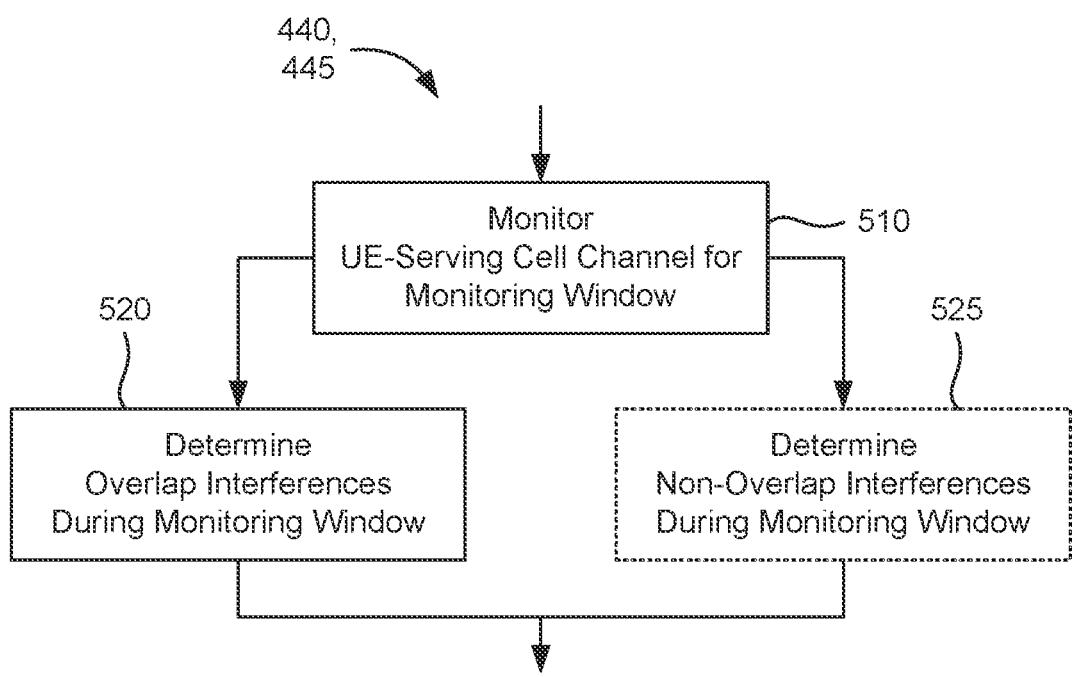

FIG. 5 illustrates a flow chart of an example process performed by the UE to implement blocks 440 and 445. In block 510, the UE (e.g., processing system 232, memory component 238, transceiver 208, measurement component 252, etc.) may monitor the UE-serving cell channel for a time duration, referred to as "monitoring window" for convenience. The duration of the monitoring window may be set within the UE (e.g., as a factory setting) and/or set by the network (e.g., through RRC configuration message).

In block 520, the UE (e.g., processing system 232, memory component 238, etc.) may determine the overlap interference based on the monitoring. Thus, in an aspect, overlap interference may represent the interference present in the UE-serving cell channel during the overlap portion of the monitoring window.

Optionally, in block 525, the UE (e.g., processing system 232, memory component 238, etc.) may also determine the non-overlap interference based on the monitoring. In an aspect, the non-overlap interference may represent the interference present in the UE-serving cell channel during the non-overlap portion of the monitoring window.

The interferences—overlap and non-overlap interferences—may be expressed as combinations of one or more quality of service (QoS) parameter values such as BLER, BER, SINR, SNR, etc. For example, OverlapIntrf may comprise any combination of OverlapBLER, OverlapBER, OverlapSINR, OverlapSNR, etc. Also, NonOverlapIntrf may comprise any combination of NonOverlapBLER, NonOverlapBER, NonOverlapSINR, OverlapSNR, etc.

Referring back to FIG. 4, in block 450, the UE (e.g., processing system 232, memory component 238, etc.) may determine whether a channel interference tolerance is exceeded based on the overlap interference and optionally based on the non-overlap interference. Block 450 may be viewed as an example implementation of determining whether the interference experienced by the UE is minimal or otherwise tolerable.

Figure 6:
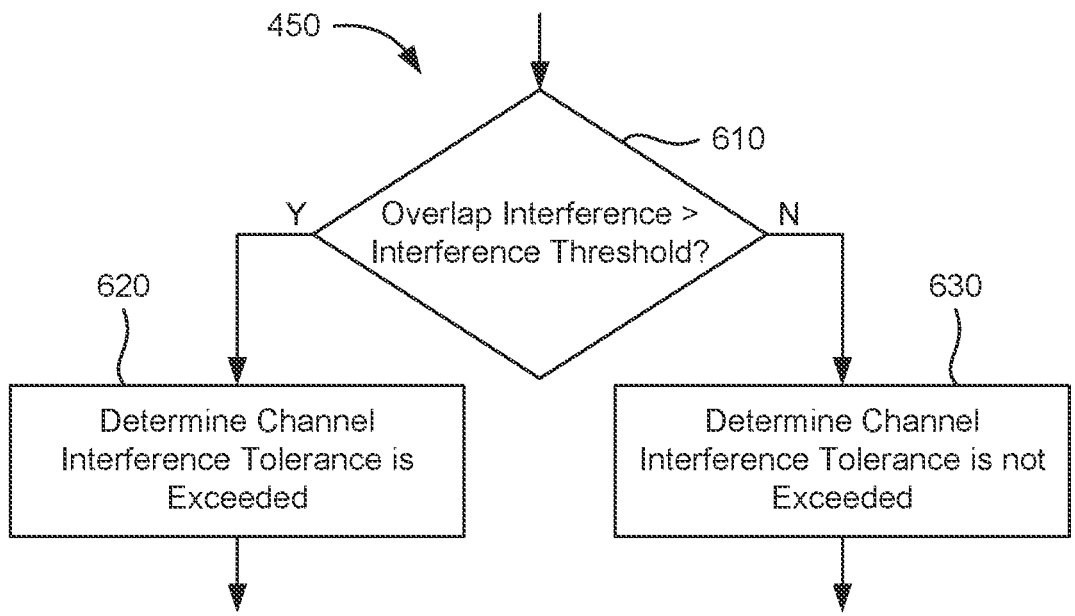

FIG. 6 illustrates a flow chart of an example process performed by the UE to implement block 450. In FIG. 6, the overlap interference (OverlapIntrf) is considered in determining whether the channel interference tolerance is exceeded or not. However, the non-overlap interference (NonOverlapIntrf) is not considered. In block 610, the UE (e.g., processing system 232, memory component 238, etc.) may determine whether the overlap interference is greater than an interference threshold (IntrfThresh) (e.g., determine whether (OverlapIntrf>IntrfThresh) is TRUE).

The interference threshold may be expressed as combinations of one or more quality of service (QoS) parameter values. For example, IntrfThresh may comprise any combination of BLERThresh, BERThresh, SINRThresh, SNRThresh, etc. Then in block 610, the overlap interference may be deemed to be greater than the interference threshold when OverlapBLER>BLERThresh, OverlapBER>BERThresh, OverlapSINR>SINRThresh, OverlapSNR>SNRThresh, etc. or any combination thereof. The interference thresholds may be set within the UE (e.g., as a factory setting) and/or set by the network (e.g., through RRC configuration message).

If the UE determines that the overlap interference is greater than the interference threshold ("Y" branch from block 610), then in block 620, the UE (e.g., processing system 232, memory component 238, etc.) may determine that the channel interference tolerance is exceeded. As an illustration, if BLER is used as a basis of comparison, then the UE may arrive at block 620 if (OverlapBLER>BLERThresh) evaluates to TRUE in block 610.

On the other hand, if the UE determines that the overlap interference is not greater than the interference threshold ("N" branch from block 610), then in block 630, the UE (e.g., processing system 232, memory component 238, etc.) may determine that the channel interference tolerance is not exceeded. Again, as an illustration, the UE may arrive at block 630 if (OverlapBLER>BLERThresh) evaluates to FALSE in block 610.

Figure 7:
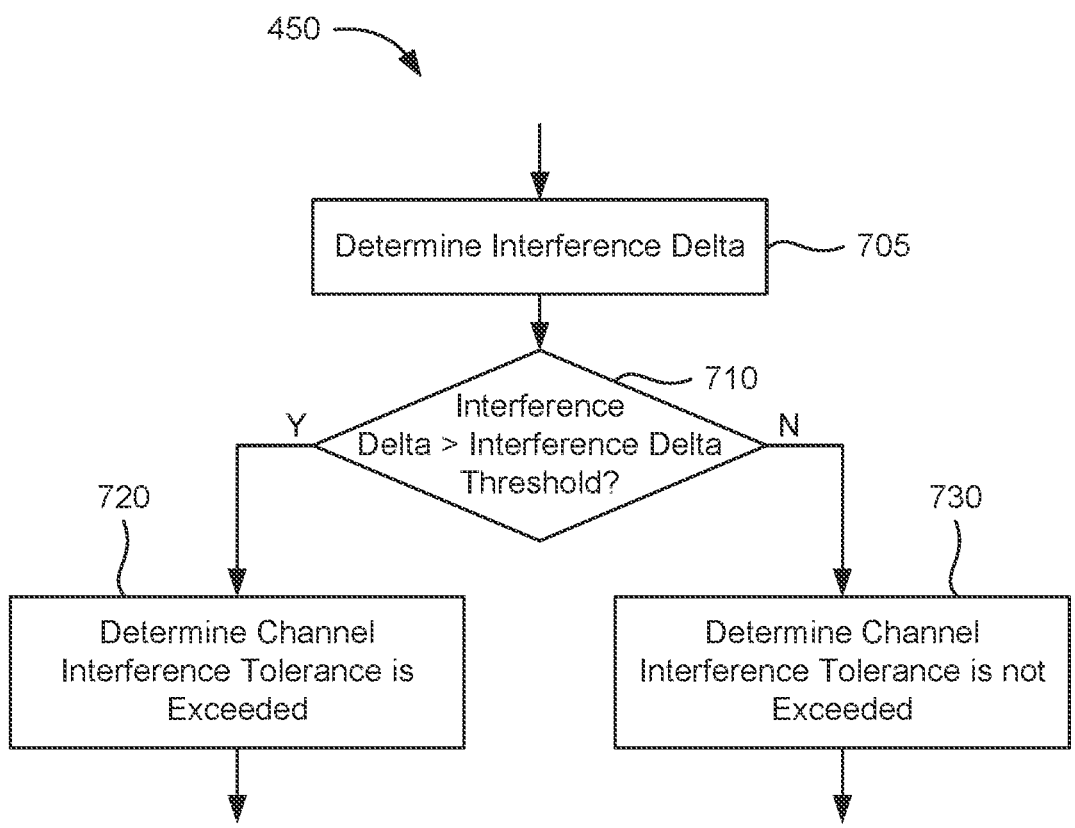

FIG. 7 illustrates another flow chart of an example process performed by the UE to implement block 450. In FIG. 7, the overlap and non-overlap interferences (OverlapIntrf, NonOverlapIntrf) are considered in determining whether the channel interference tolerance is exceeded or not. In particular, the overlap interference in relation to the non-overlap interference may be considered.

In block 705, the UE (e.g., processing system 232, memory component 238, etc.) may determine an interference delta representing a comparison between the overlap and non-overlap interferences. For example, the interference delta (IntrfDelta) may be a difference (e.g., OverlapIntrf−NonOverlapIntrf), a ratio (e.g., OverlapIntrf/NonOverlapIntrf), a proportion (e.g., OverlapIntrf/(OverlapIntrf+NonOverlapintrf)), etc.

In an aspect, the interference delta may be expressed as combinations of deltas of one or more QoS parameters. For example, IntrfDelta comprise any combination of BLERDelta, BERDelta, SINRDelta, SNRDelta, etc. As an illustration, if BLER is used for delta, then BLERdelta may be a difference (e.g., OverlapBLER−NonOverlapBLER), a ratio (e.g., OverlapBLER/NonOverlapBLER), a proportion (e.g., OverlapBLER/(OverlapBLER+NonOverlapBLER)), etc.

In block 710, the UE (e.g., processing system 232, memory component 238, etc.) may determine whether the interference delta is greater than an interference delta threshold (IntrfDeltaThresh), (e.g., determine whether (IntrfDelta>IntrfDeltaThresh) is TRUE). In an aspect, the interference delta threshold may be expressed as combinations of one or more quality of service (QoS) parameter values. For example, IntrfDeltaThresh may comprise any combination of BLERDeltaThresh, BERDeltaThresh, SINRDeltaThresh, SNRDeltaThresh, etc. Then the interference delta may be deemed to be greater than the interference delta threshold when BLERDelta>BLERDeltaThresh, BERDelta>BERDeltaThresh, SINRDelta>SINRDeltaThresh, SNRDelta>SNRDeltaThresh, etc. or any combination thereof. The interference delta thresholds may be set within the UE (e.g., as a factory setting) and/or set by the network (e.g., through RRC configuration message).

If the UE determines that the interference delta is greater than the interference delta threshold ("Y" branch from block 710) (e.g., BLERDelta>BLERDeltaThresh evaluates to TRUE), then in block 720, the UE (e.g., processing system 232, memory component 238, etc.) may determine that the channel interference tolerance is exceeded.

On the other hand, if the UE determines that the interference delta is not greater than the interference delta threshold ("N" branch from block 710) (e.g., BLERDelta>BLERDeltaThresh evaluates to FALSE), then in block 730, the UE (e.g., processing system 232, memory component 238, etc.) may determine that the channel interference tolerance is not exceeded.

Referring back to FIG. 4, if the UE determines that the channel interference tolerance is not exceeded ("N" branch from block 450), then in block 470, the UE (e.g., processing system 232, memory component 238, transceiver 208, etc.) may transmit the UL traffic to the serving cell on UL resources (e.g., slots, frames, subframes, etc.) granted to the UE.

On the other hand, if the UE determines that the channel interference tolerance is exceeded ("Y" branch from block 450), then in block 460, the UE (e.g., processing system 232, memory component 238, etc.) may determine whether the UL traffic is delay tolerant.

Whether the UL traffic is delay tolerant or not may be based on a query to the application (e.g., email, browser, etc.) responsible for the UL traffic or may be based on a quality identification (e.g., LTE's QoS class identifier (QCI), 5G QoS identifier (5QI), etc.) of the UL traffic. In one aspect, UL traffic that is not associated with a guaranteed data rate may be considered as being delay tolerant. For example, non-guaranteed bit rate (non-GBR) traffic may be determined to be delay tolerant.

Even if there is some latency requirement associated with UL traffic, it may still be considered to be delay tolerant depending on the time scale. For example, if the UL traffic can be delayed in the order of one or multiple seconds, it may be considered to be delay tolerant. In another example, if the UL traffic may be delayed at least as long as ACK/NACK timeout of transport control protocol (TCP) layer, it may be considered to be delay tolerant. On a flip side, if the UL traffic is ultra-reliable low latency communications (URLLC) data, then the UL traffic may be deemed as NOT being delay tolerant. These are merely examples, and should not be taken as being exhaustive.

If the UE determines that the UL traffic is NOT delay tolerant ("N" branch from block 460, then the UE (e.g., processing system 232, memory component 238, transceiver 208, etc.) in block 470 may transmit the UL traffic to the serving cell on granted UL resources.

On the other hand, if the determines that the UL traffic is delay tolerant ("Y" branch from block 460, then in block 480, the UE (e.g., processing system 232, memory component 238, transceiver 208, measurement component 252, etc.) may perform a probabilistic transmission of the UL traffic to the serving cell such that the likelihood of likelihood of the UL traffic being transmitted to the serving cell is less than one. In other words, the UL data may be transmitted or not. By reducing the probability of transmitting the UL, the interference in the system as a whole may be reduced if other UEs also perform probabilistic transmission.

Figure 8:
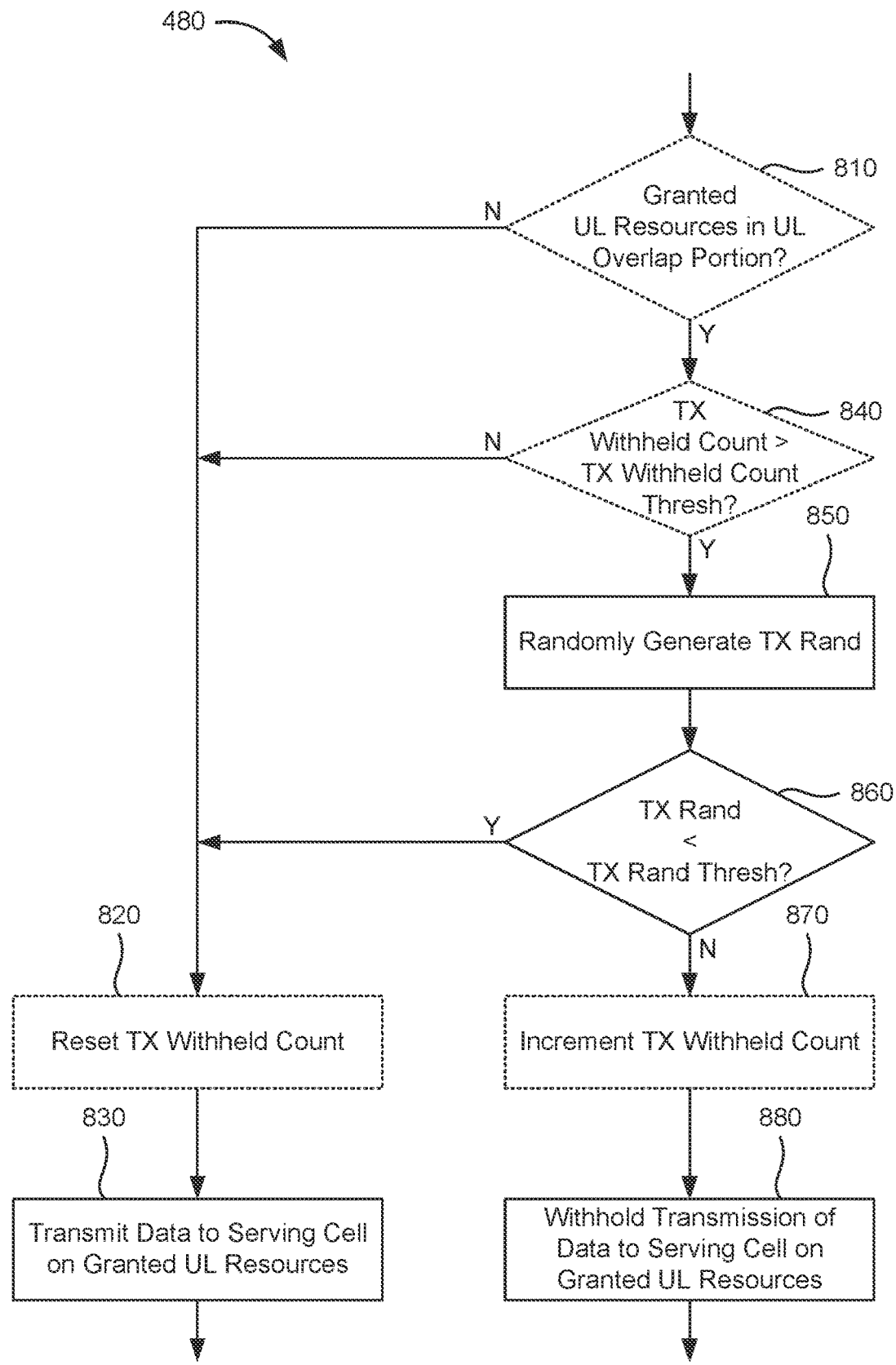

FIG. 8 illustrates a flow chart of an example process performed by the UE to implement block 480. In block 810, the UE (e.g., processing system 232, memory component 238, etc.) may determine whether the overlap portion comprises the granted UL resources at least in part. That is, the UE may determine whether any of the granted UL resources are overlap with the DL resources of the cells of the neighbor cell set.

If the overlap portion does not comprise any of the granted UL resources ("N" branch from block 810), then in block 820, the UE (e.g., processing system 232, memory component 238, etc.) may reset a transmit (TX) withheld count (more on this below).

Also when the overlap portion does not comprise any of the granted UL resources, the UE (e.g., processing system 232, memory component 238, transceiver 208, etc.) may transmit the UL traffic to the serving cell on the granted UL resources.

Note that blocks 820 and 830 need not be performed in the specific order as shown in FIG. 8. For example, block 830 may be performed followed by block 820. Indeed, in another example, blocks 820 and 830 may be simultaneously executed. It is sufficient that blocks 820 and 830 be performed when it is determined that the overlap portion does not comprise any of the granted UL resources.

The TX withheld count may be used to maintain a count of a number of times the UL traffic has been withheld from being transmitted since the last transmission from the UE to the serving cell. As will be seen, the TX withheld count may be used to prevent transmission starvation of the UL traffic. To state it another way, the TX withheld count may be used to ensure that the UL traffic will be transmitted at some point in time.

If the overlap portion does comprise at least a part of the granted UL resources ("Y" branch from block 810), then in block 840, the UE (e.g., processing system 232, memory component 238, etc.) may determine whether the TX withheld count is greater than a TX withheld count threshold. The TX withheld count threshold may be set within the UE (e.g., as a factory setting) and/or set by the network (e.g., through RRC configuration message).

If the UE determines that the TX withheld count is not greater than the TX withheld count threshold ("N" branch from block 840), then the UE may proceed to blocks 820 and 830 as described above.

However, if the UE determines that the TX withheld count is greater than the TX withheld count threshold ("Y" branch from block 840), then in block 850, the UE (e.g., processing system 232, memory component 238, etc.) may generate a random value referred to as "TX rand".

In block 860, the UE (e.g., processing system 232, memory component 238, etc.) may compare TX rand with TX rand threshold. For example, the UE may determine whether TX rand is less than the TX rand threshold. The TX rand threshold may be set within the UE (e.g., as a factory setting) and/or set by the network (e.g., through RRC configuration message).

If the UE determines that the TX rand is less than the TX rand threshold ("Y" branch from block 860), then the UE may proceed to blocks 820 and 830 as described above.

On the other hand, if the UE determines that the TX rand is not less than the TX rand threshold ("N" branch from block 860), then in block 870, the UE (e.g., processing system 232, memory component 238, etc.) may increment the transmit (TX) withheld count.

Also, when the TX rand is not less than the TX rand threshold, in block 880, the UE (e.g., processing system 232, memory component 238, etc.) may withhold transmission of data to serving cell on granted UL resources. Note that block 880 is not necessarily a positive action that the UE performs. Rather, block 880 is illustrated to emphasize that no transmission of the UL traffic takes place.

Following are noted. In block 860, a "less than" comparison is made between TX rand and TX rand threshold. But this is merely one comparison example. Alternatively, a "greater than" comparison may be made, in which case, the "N" and "Y" branches would be switched.

Also in an aspect, the TX rand threshold may be adjusted, e.g., depending on the existing interference level. For example, if the interference of the system is very significant, then the TX rand threshold may be set such that the likelihood of transmitting the UL traffic decreases/withholding the UL traffic increases. Conversely, if the interference of the system is less significant, then the TX rand threshold may be set such that the likelihood of transmitting the UL traffic increases/withholding the UL traffic decreases.

In FIG. 8, blocks 810, 820, 840 and 860 are illustrated as being optional. That is, in an aspect, performing blocks 850, 860, 830 and 880 may be sufficient to accomplish the probabilistic transmission. However, blocks 810, 840, 820 and 870, when implemented, may provide at least the following benefits. Block 810 may be implemented for the following reason. Recall that probabilistic transmission can reduce interference by NOT always transmitting the UL traffic even if resources—the granted UL resources—are scheduled for such transmission. However, if the overlap portion does not include the granted UL resources, then transmitting on the granted UL resources should not increase interference to the system in any significant manner. Thus, block 810 may enhance performance.

Blocks 840, 820 and 870 may prevent UL traffic transmission starvation. Note that for each comparison made in block 860, there is a chance that the transmission will be withheld. If this happens consecutively for a number of comparisons, the UL traffic may be starved from being transmitted. Incorporating 840, 820 and 870 can ensure that the UL traffic will be transmitted, i.e., not be starved.

Figure 9:
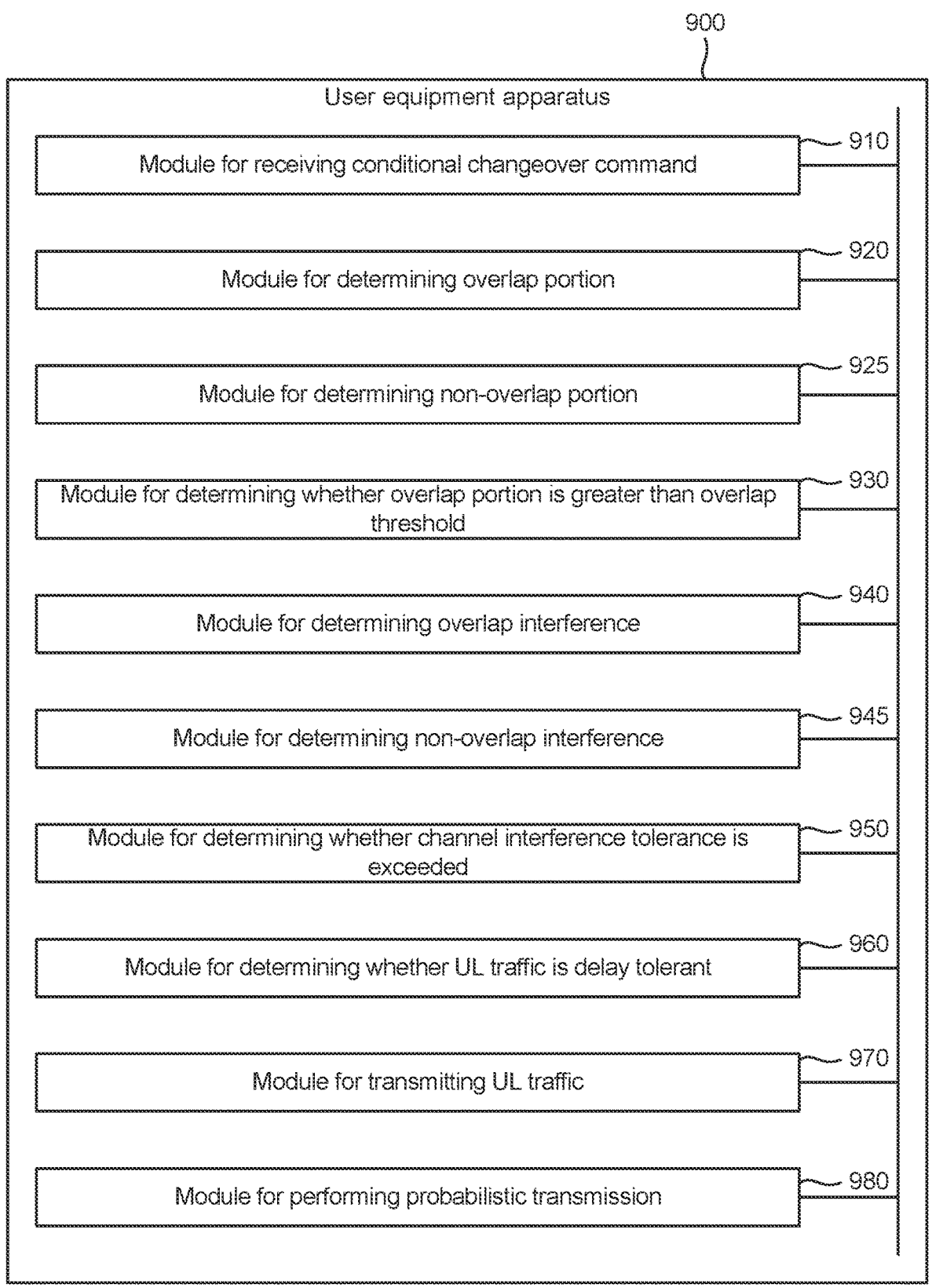
FIG. 9 illustrates a simplified block diagram of several sample aspects of an apparatus configured for optimized interference handling in accordance with one or more aspects of the disclosure.

FIG. 9 illustrates an example user equipment apparatus 900 represented as a series of interrelated functional modules connected by a common bus. Each of the modules may be implemented in hardware or as a combination of hardware and software. For example, the modules may be implemented as any combination of the modules of the apparatus 202 of FIG. 2. A module for receiving the conditional changeover command 910 may correspond at least in some aspects to a communication device (e.g., communication device 208), a processing system (e.g., processing system 232) and/or a memory component (e.g., memory component 238). A module for determining an overlap portion 920 may correspond at least in some aspects to a processing system (e.g., processing system 232) and/or a memory component (e.g., memory component 238). A module for determining a non-overlap portion 925 may correspond at least in some aspects to a processing system (e.g., processing system 232) and/or a memory component (e.g., memory component 238). A module for determining whether an overlap portion is greater than an overlap portion threshold 930 may correspond at least in some aspects to a processing system (e.g., processing system 232) and/or a memory component (e.g., memory component 238). A module for determining an overlap interference 940 may correspond at least in some aspects to a communication device (e.g., communication device 208), a processing system (e.g., processing system 232), a memory component (e.g., memory component 238), and/or a measurement component (e.g., measurement component 252). A module for determining a non-overlap interference 945 may correspond at least in some aspects to a communication device (e.g., communication device 208), a processing system (e.g., processing system 232), a memory component (e.g., memory component 238), and/or a measurement component (e.g., measurement component 252). A module for determining whether channel interference tolerance is exceeded 950 may correspond at least in some aspects to a processing system (e.g., processing system 232) and/or a memory component (e.g., memory component 238). A module for determining whether the UL traffic is delay tolerant 960 may correspond at least in some aspects to a processing system (e.g., processing system 232) and/or a memory component (e.g., memory component 238). A module for transmitting the UL traffic 970 may correspond at least in some aspects to a communication device (e.g., communication device 208), a processing system (e.g., processing system 232) and/or a memory component (e.g., memory component 238). A module for performing the probabilistic transmission of a UL traffic 980 may correspond at least in some aspects to a communication device (e.g., communication device 208), a processing system (e.g., processing system 232) and/or a memory component (e.g., memory component 238).

The functionality of the modules of FIG. 9 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 9, as well as other components and functions described herein, may be implemented using any suitable means. Such means also may be implemented, at least in part, using corresponding structure as taught herein. For example, the components described above in conjunction with the "module for" components of FIG. 9 also may correspond to similarly designated "means for" functionality. Thus, in some aspects one or more of such means may be implemented using one or more of processor components, integrated circuits, or other suitable structure as taught herein.

Figure 10:
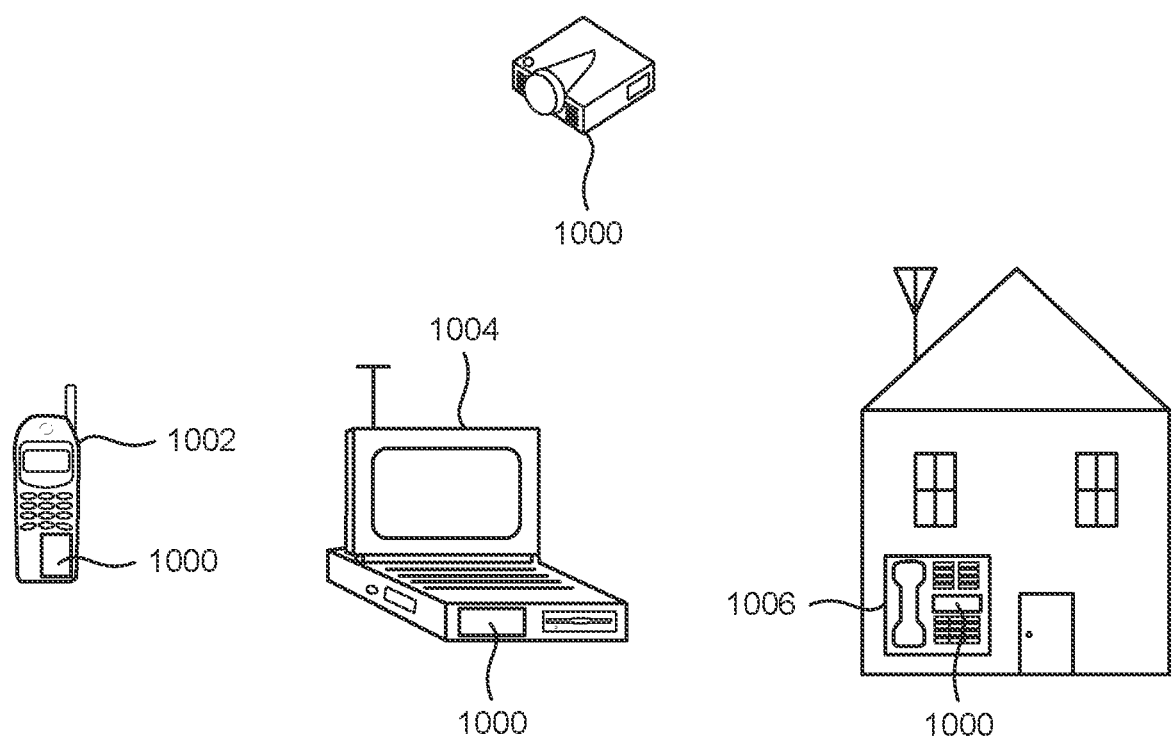
FIG. 10 illustrates non-limiting examples of devices with cell selection devices integrated therein.

FIG. 10 illustrates various electronic devices that may be integrated with the aforementioned apparatus illustrated in FIG. 2. For example, a mobile phone device 1002, a laptop computer device 1004, a terminal device 1006 as well as wearable devices, portable systems, that require small form factor, extreme low profile, may include an apparatus 1000 that incorporates the aforementioned devices/systems as described herein. The apparatus 1000 may also be a standalone device, such as a video sensor, a toy, a fixed sensor, an IoT (Internet of Things) device, etc. The devices 1002, 1004, 1006 illustrated in FIG. 10 are merely exemplary. Other electronic devices may also feature the apparatus 1000 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles, or any other device that stores or retrieves data or computer instructions, or any combination thereof.

The following provides an overview of examples of the present disclosure:

Example 1

A method of a user equipment (UE), comprising: receiving, from a serving cell, a conditional changeover command comprising a neighbor cell configuration of a neighbor cell set comprising one or more cells that neighbor the serving cell, the neighbor cell configuration indicating resource configurations of downlink (DL) resources of the cells of the neighbor cell set; determining, based on the neighbor cell configuration, an overlap portion comprising uplink (UL) resources of the serving cell that overlap in time with the DL resources of the cells of the neighbor cell set; determining an overlap interference representing interference present in a UE-serving cell channel during the overlap portion, the UE-serving cell channel being a communication channel between the UE and the serving cell; determining, based on the overlap interference, whether a channel interference tolerance is exceeded; and performing, when the channel interference tolerance is exceeded, a probabilistic transmission of a UL traffic to the serving cell on granted UL resources, the UL traffic comprising data, wherein a likelihood of the UL traffic being transmitted to the serving cell is less than one.

Example 2

The method of example 1, further comprising: determining whether the overlap portion is greater than an overlap portion threshold, wherein determining the overlap interference is performed when the overlap portion is greater than the overlap portion threshold.

Example 3

The method of example 2, further comprising: transmitting the UL traffic to the serving cell on the granted UL resources when the overlap portion is not greater than the overlap portion threshold.

Example 4

The method of any of examples 1-3, wherein determining the overlap interference comprises: monitoring the UE-serving cell channel for a monitoring window; and determining the overlap interference as the interference present in the UE-serving cell channel during the overlap portion of the monitoring window.

Example 5

The method of example 4, wherein determining whether the channel interference tolerance is exceeded comprises: determining whether the overlap interference is greater than an interference threshold; and determining that the channel interference tolerance is exceeded when the overlap interference is greater than the interference threshold.

Example 6

The method of example 4, further comprising: determining, based on the neighbor cell configuration, a non-overlap portion comprising UL resources of the serving cell that do not overlap in time with the DL resources of the cells of the neighbor cell set; and determining, based on the non-overlap portion, a non-overlap interference representing interference present in the UE-serving cell channel during the non-overlap portion.

Example 7

The method of example 6, wherein determining the non-overlap interference comprises: determining the non-overlap interference as the interference present in the UE-serving cell channel during the non-overlap portion of the monitoring window.

Example 8

The method of example 7, wherein determining whether the channel interference tolerance is exceeded comprises: determining, based on the overlap and non-overlap interferences, an interference delta representing a comparison between the overlap and non-overlap interferences; determining whether the interference delta is greater than an interference delta threshold; and determining that the channel interference tolerance is exceeded when the interference delta is greater than the interference delta threshold.

Example 9

The method of any of examples 1-8, further comprising: determining whether the UL traffic is delay tolerant, wherein the probabilistic transmission of the UL traffic is performed when both the channel interference tolerance is exceeded and the UL traffic is delay tolerant.

Example 10

The method of example 9, wherein the UL traffic is delay tolerant when there is no guaranteed data rate requirement associated with the UL traffic.

Example 11

The method of any of examples 1-10, wherein performing the probabilistic transmission of the UL traffic comprises: randomly generating a transmit (TX) rand; determining, based on a comparison of the TX rand with a TX rand threshold, whether the UL traffic is to be transmitted or withheld from transmission; transmitting the UL traffic to the serving cell on the granted UL resources when the UL traffic is to be transmitted; and withholding the UL traffic from being transmitted to the serving cell when the UL traffic is to be withheld from transmission.

Example 12

The method of example 11, wherein performing the probabilistic transmission of the UL traffic further comprises: determining, prior to randomly generating the TX rand, whether a TX withheld count is greater than a TX withheld count threshold; resetting the TX withheld count when the UL traffic is to be transmitted; and incrementing the TX withheld count when the UL traffic is to be withheld from transmission, wherein the TX rand is generated when the TX withheld count is not greater than the TX withheld count threshold, and wherein the TX withheld count is reset and the UL traffic is transmitted to the serving cell on the granted UL resources when the TX withheld count is greater than the TX withheld count threshold.

Example 13

The method of any of examples 11-12, wherein performing the probabilistic transmission of the UL traffic further comprises: determining whether the overlap portion comprises the granted UL resources at least in part, wherein the TX rand is generated when the overlap portion does comprise the granted UL resources at least in part, and wherein the UL traffic is transmitted to the serving cell on the granted UL resources when the overlap portion does not comprise any of the granted UL resources.

Example 14

The method of any of examples 1-13, wherein the resource configurations of inter-frequency cells of the neighbor cell set are not considered in determining the overlap portion, each inter-frequency cell being a cell of the neighbor cell set that operate on a different frequency from the serving cell.

Example 15

A user equipment comprising at least one means for performing a method of any of examples 1-14.

Example 16

A user equipment comprising a processor, memory coupled with the processor, the processor and memory configured perform a method of examples 1-14.

Example 17

A non-transitory computer-readable medium storing code for a user equipment comprising a processor, memory coupled with the processor, and instructions stored in the memory and executable by the processor to cause the user equipment to perform a method of any of examples 1-14.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of a user equipment (UE), the method comprising:
   receiving, from a serving cell, a conditional changeover command comprising a neighbor cell configuration of a neighbor cell set comprising one or more cells that neighbor the serving cell, the neighbor cell configuration indicating resource configurations of downlink (DL) resources of the cells of the neighbor cell set;
   determining, based on the neighbor cell configuration, an overlap portion comprising uplink (UL) resources of the serving cell that overlap in time with the DL resources of the cells of the neighbor cell set;
   determining an overlap interference representing interference present in a UE-serving cell channel during the overlap portion, the UE-serving cell channel being a communication channel between the UE and the serving cell;
   determining, based on the overlap interference, whether a channel interference tolerance is exceeded; and
   performing, when the channel interference tolerance is exceeded, a probabilistic transmission of a UL traffic to the serving cell on granted UL resources, the UL traffic comprising data, wherein a likelihood of the UL traffic being transmitted to the serving cell is less than one.

2. The method of claim 1, further comprising:
   determining whether the overlap portion is greater than an overlap portion threshold,
   wherein determining the overlap interference is performed when the overlap portion is greater than the overlap portion threshold.

3. The method of claim 2, further comprising:
   transmitting the UL traffic to the serving cell on the granted UL resources when the overlap portion is not greater than the overlap portion threshold.

4. The method of claim 1, wherein determining the overlap interference comprises:
   monitoring the UE-serving cell channel for a monitoring window; and
   determining the overlap interference as the interference present in the UE-serving cell channel during the overlap portion of the monitoring window.

5. The method of claim 4, wherein determining whether the channel interference tolerance is exceeded comprises:
   determining whether the overlap interference is greater than an interference threshold; and
   determining that the channel interference tolerance is exceeded when the overlap interference is greater than the interference threshold.

6. The method of claim 4, further comprising:
   determining, based on the neighbor cell configuration, a non-overlap portion comprising UL resources of the serving cell that do not overlap in time with the DL resources of the cells of the neighbor cell set; and
   determining, based on the non-overlap portion, a non-overlap interference representing interference present in the UE-serving cell channel during the non-overlap portion.

7. The method of claim 6, wherein determining the non-overlap interference comprises:
   determining the non-overlap interference as the interference present in the UE-serving cell channel during the non-overlap portion of the monitoring window.

8. The method of claim 7, wherein determining whether the channel interference tolerance is exceeded comprises:
   determining, based on the overlap and non-overlap interferences, an interference delta representing a comparison between the overlap and non-overlap interferences;
   determining whether the interference delta is greater than an interference delta threshold; and
   determining that the channel interference tolerance is exceeded when the interference delta is greater than the interference delta threshold.

9. The method of claim 1, further comprising:
   determining whether the UL traffic is delay tolerant,
   wherein the probabilistic transmission of the UL traffic is performed when both the channel interference tolerance is exceeded and the UL traffic is delay tolerant.

10. The method of claim 9, wherein the UL traffic is delay tolerant when there is no guaranteed data rate requirement associated with the UL traffic.

11. The method of claim 1, wherein performing the probabilistic transmission of the UL traffic comprises:
    randomly generating a transmit (TX) rand;
    determining, based on a comparison of the TX rand with a TX rand threshold, whether the UL traffic is to be transmitted or withheld from transmission;
    transmitting the UL traffic to the serving cell on the granted UL resources when the UL traffic is to be transmitted; and
    withholding the UL traffic from being transmitted to the serving cell when the UL traffic is to be withheld from transmission.

12. The method of claim 11, wherein performing the probabilistic transmission of the UL traffic further comprises:
    determining, prior to randomly generating the TX rand, whether a TX withheld count is greater than a TX withheld count threshold;
    resetting the TX withheld count when the UL traffic is to be transmitted; and
    incrementing the TX withheld count when the UL traffic is to be withheld from transmission,
    wherein the TX rand is generated when the TX withheld count is not greater than the TX withheld count threshold, and
    wherein the TX withheld count is reset and the UL traffic is transmitted to the serving cell on the granted UL resources when the TX withheld count is greater than the TX withheld count threshold.

13. The method of claim 11, wherein performing the probabilistic transmission of the UL traffic further comprises:
    determining whether the overlap portion comprises the granted UL resources at least in part, wherein the TX rand is generated when the overlap portion does comprise the granted UL resources at least in part, and
wherein the UL traffic is transmitted to the serving cell on the granted UL resources when the overlap portion does not comprise any of the granted UL resources.

14. The method of claim 1, wherein the resource configurations of inter-frequency cells of the neighbor cell set are not considered in determining the overlap portion, each inter-frequency cell being a cell of the neighbor cell set that operate on a different frequency from the serving cell.

15. A user equipment (UE), comprising:
a processor;
a memory; and
a transceiver,
wherein the processor, the memory, and/or the transceiver are configured to:
receive, from a serving cell, a conditional changeover command comprising a neighbor cell configuration of a neighbor cell set comprising one or more cells that neighbor the serving cell, the neighbor cell configuration indicating resource configurations of downlink (DL) resources of the cells of the neighbor cell set;
determine, based on the neighbor cell configuration, an overlap portion comprising uplink (UL) resources of the serving cell that overlap in time with the DL resources of the cells of the neighbor cell set;
determine an overlap interference representing interference present in a UE-serving cell channel during the overlap portion, the UE-serving cell channel being a communication channel between the UE and the serving cell;
determine, based on the overlap interference, whether a channel interference tolerance is exceeded; and
perform, when the channel interference tolerance is exceeded, a probabilistic transmission of a UL traffic to the serving cell on granted UL resources, the UL traffic comprising data, wherein a likelihood of the UL traffic being transmitted to the serving cell is less than one.

16. The UE of claim 15, wherein the processor, the memory, and/or the transceiver are further configured to:
determine whether the overlap portion is greater than an overlap portion threshold,
wherein the processor, the memory, and/or the transceiver are configured to determine the overlap interference when the overlap portion is greater than the overlap portion threshold.

17. The UE of claim 16, wherein the processor, the memory, and/or the transceiver are further configured to:
transmit the UL traffic to the serving cell on the granted UL resources when the overlap portion is not greater than the overlap portion threshold.

18. The UE of claim 15, wherein in determining the overlap interference, the processor, the memory, and/or the transceiver are configured to:
monitor the UE-serving cell channel for a monitoring window; and
determine the overlap interference as the interference present in the UE-serving cell channel during the overlap portion of the monitoring window.

19. The UE of claim 18, wherein in determining whether the channel interference tolerance is exceeded, the processor, the memory, and/or the transceiver are configured to:
determine whether the overlap interference is greater than an interference threshold; and
determine that the channel interference tolerance is exceeded when the overlap interference is greater than the interference threshold.

20. The UE of claim 18, wherein the processor, the memory, and/or the transceiver are further configured to:
determine, based on the neighbor cell configuration, a non-overlap portion comprising UL resources of the serving cell that do not overlap in time with the DL resources of the cells of the neighbor cell set; and
determine, based on the non-overlap portion, a non-overlap interference representing interference present in the UE-serving cell channel during the non-overlap portion.

21. The UE of claim 20, wherein in determining the non-overlap interference, the processor, the memory, and/or the transceiver are configured to:
determine the non-overlap interference as the interference present in the UE-serving cell channel during the non-overlap portion of the monitoring window.

22. The UE of claim 21, wherein in determining whether the channel interference tolerance is exceeded, the processor, the memory, and/or the transceiver are configured to:
determine, based on the overlap and non-overlap interferences, an interference delta representing a comparison between the overlap and non-overlap interferences;
determine whether the interference delta is greater than an interference delta threshold; and
determine that the channel interference tolerance is exceeded when the interference delta is greater than the interference delta threshold.

23. The UE of claim 15, wherein the processor, the memory, and/or the transceiver are further configured to:
determine whether the UL traffic is delay tolerant,
wherein the processor, the memory, and/or the transceiver are configured to perform the probabilistic transmission of the UL traffic when both the channel interference tolerance is exceeded and the UL traffic is delay tolerant.

24. The UE of claim 23, wherein the UL traffic is delay tolerant when there is no guaranteed data rate requirement associated with the UL traffic.

25. The UE of claim 15, wherein in performing the probabilistic transmission of the UL traffic, the processor, the memory, and/or the transceiver are configured to:
randomly generate a transmit (TX) rand;
determine, based on a comparison of the TX rand with a TX rand threshold, whether the UL traffic is to be transmitted or withheld from transmission;
transmit the UL traffic to the serving cell on the granted UL resources when the UL traffic is to be transmitted; and
withhold the UL traffic from being transmitted to the serving cell when the UL traffic is to be withheld from transmission.

26. The UE of claim 25, wherein in performing the probabilistic transmission of the UL traffic, the processor, the memory, and/or the transceiver are further configured to:
determine, prior to randomly generating the TX rand, whether a TX withheld count is greater than a TX withheld count threshold;
reset the TX withheld count when the UL traffic is to be transmitted; and
increment the TX withheld count when the UL traffic is to be withheld from transmission,
wherein the processor, the memory, and/or the transceiver are configured to:

generate the TX rand when the TX withheld count is not greater than the TX withheld count threshold, and reset the TX withheld count and transmit the UL traffic to the serving cell on the granted UL resources when the TX withheld count is greater than the TX withheld count threshold.

27. The UE of claim 25, wherein in performing the probabilistic transmission of the UL traffic, the processor, the memory, and/or the transceiver are further configured to:

determine whether the overlap portion comprises the granted UL resources at least in part, wherein the processor, the memory, and/or the transceiver are configured to:

generate the TX rand when the overlap portion does comprise the granted UL resources at least in part, and transmit the UL traffic to the serving cell on the granted UL resources when the overlap portion does not comprise any of the granted UL resources.

28. The UE of claim 15, wherein the processor, the memory, and/or the transceiver are configured to refrain from considering the resource configurations of inter-frequency cells of the neighbor cell set when determining the overlap portion, each inter-frequency cell being a cell of the neighbor cell set that operate on a different frequency from the serving cell.

29. A user equipment (UE), comprising:

means for receiving, from a serving cell, a conditional changeover command comprising a neighbor cell configuration of a neighbor cell set comprising one or more cells that neighbor the serving cell, the neighbor cell configuration indicating resource configurations of downlink (DL) resources of the cells of the neighbor cell set;

means for determining, based on the neighbor cell configuration, an overlap portion comprising uplink (UL) resources of the serving cell that overlap in time with the DL resources of the cells of the neighbor cell set;

means for determining an overlap interference representing interference present in a UE-serving cell channel during the overlap portion, the UE-serving cell channel being a communication channel between the UE and the serving cell;

means for determining, based on the overlap interference, whether a channel interference tolerance is exceeded; and means for performing, when the channel interference tolerance is exceeded, a probabilistic transmission of a UL traffic to the serving cell on granted UL resources, the UL traffic comprising data, wherein a likelihood of the UL traffic being transmitted to the serving cell is less than one.

30. A non-transitory computer-readable medium storing computer-executable instructions for a user equipment (UE), the computer-executable instructions comprising:

one or more instructions instructing the UE to receive, from a serving cell, a conditional changeover command comprising a neighbor cell configuration of a neighbor cell set comprising one or more cells that neighbor the serving cell, the neighbor cell configuration indicating resource configurations of downlink (DL) resources of the cells of the neighbor cell set;

one or more instructions instructing the UE to determine, based on the neighbor cell configuration, an overlap portion comprising uplink (UL) resources of the serving cell that overlap in time with the DL resources of the cells of the neighbor cell set;

one or more instructions instructing the UE to determine an overlap interference representing interference present in a UE-serving cell channel during the overlap portion, the UE-serving cell channel being a communication channel between the UE and the serving cell;

one or more instructions instructing the UE to determine, based on the overlap interference, whether a channel interference tolerance is exceeded; and one or more instructions instructing the UE to perform, when the channel interference tolerance is exceeded, a probabilistic transmission of a UL traffic to the serving cell on granted UL resources, the UL traffic comprising data, wherein a likelihood of the UL traffic being transmitted to the serving cell is less than one.

* * * * *